(12) United States Patent
Ochiai

(10) Patent No.: US 6,924,039 B2
(45) Date of Patent: Aug. 2, 2005

(54) COMPOSITION COMPRISING A HYDROLYZABLE ORGANOSILICON COMPOUND AND COATING OBTAINED FROM THE SAME

(75) Inventor: Shinsuke Ochiai, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 194 days.

(21) Appl. No.: 10/290,489

(22) Filed: Nov. 8, 2002

(65) Prior Publication Data

US 2003/0091839 A1 May 15, 2003

(30) Foreign Application Priority Data

Nov. 13, 2001 (JP) .......................... 2001-347085
Mar. 12, 2002 (JP) .......................... 2002-066615

(51) Int. Cl.⁷ .............................. B32B 9/06; B32B 15/04
(52) U.S. Cl. .................... 428/450; 428/413; 428/500; 524/200; 524/201; 524/435; 524/443; 524/789; 524/847; 524/858
(58) Field of Search ........................... 428/450; 524/858

(56) References Cited

U.S. PATENT DOCUMENTS

| 3,976,497 A | * | 8/1976 | Clark ............... 106/287.16 |
| 5,654,090 A | * | 8/1997 | Kayanoki ............... 428/329 |
| 5,858,077 A | * | 1/1999 | Kayanoki ............ 106/287.11 |

FOREIGN PATENT DOCUMENTS

| JP | 09053030 | * | 2/1887 | ............ C09D/5/24 |
| JP | 7-48527 A | | 2/1995 | |
| JP | 7-48543 A | | 2/1995 | |
| JP | 07048527 | * | 2/1995 | ............ C09D/5/00 |
| JP | 07048543 | * | 2/1995 | ......... C09D/183/02 |
| JP | 7-133105 A | | 5/1995 | |
| JP | 07133105 | * | 5/1995 | ........... C01B/33/20 |
| JP | 2000144015 | * | 5/2000 | ............ C09D/5/00 |

* cited by examiner

*Primary Examiner*—Johann Richter
*Assistant Examiner*—Chukwuma Nwaonicha
(74) *Attorney, Agent, or Firm*—Sughrue Mion, PLLC

(57) ABSTRACT

A composition comprising a hydrolyzable organosilicon compound and porous fine particles, a coating made from the composition and a laminated plate comprising a substrate and the coating are provided. The coating is superior in adhering properties to a substrate and is equipped with an adequate hardness.

6 Claims, 3 Drawing Sheets

COMPOSITION COMPRISING A HYDROLYZABLE ORGANOSILICON COMPOUND AND COATING OBTAINED FROM THE SAME

FIELD OF THE INVENTION

The present invention relates to a composition comprising a hydrolyzable organosilicon compound and porous fine particles, a coating obtained from the composition and a laminated plate comprising a substrate and the coating.

BACKGROUND OF THE INVENTION

Functional coatings such as a mar resistant coating, an antistatic film, an anti-reflection film and a surface protective film have been conventionally formed and utilized on the surface of transparent substrates such as glass and resin for a display. Especially, when the substrate is made from a resin, a hard coat layer made from an acrylic resin or the like is used as a surface protective film.

However, conventionally utilized coatings such as an acryl resin coating have different adhering degrees depending on a resin for a substrate onto which the coating is placed. In particular, when a methyl methacrylate-styrene copolymer resin is used for the substrate, the adhering degree of the commonly-used coating tends to be greatly lowered.

SUMMARY OF THE INVENTION

Accordingly, the present inventor has intensively studied in order to develop a material which shows sufficient adhering properties to a substrate, in particular, to a methyl methacrylate-styrene copolymer resin substrate as well as a poly(methyl methacrylate) resin substrate. As a result, the present inventor has found that a coating obtained from a composition comprising a hydrolyzable organosilicon compound and porous fine particles has sufficient adhering properties to a substrate. The present invention has been accomplished based on such findings.

The present invention provides a composition comprising about 20% by weight to about 90% by weight of a hydrolyzable organosilicon compound and about 10% by weight to about 80% by weight of porous fine particles based on the total amount of the hydrolyzable organosilicon compound and the porous fine particles. Further, the present invention provides a coating and a paint, each of which is obtained from the composition. Moreover, the present invention provides a laminated plate comprising the coating and a substrate.

DETAILED DESCRIPTION OF THE INVENTION

Figure 1:
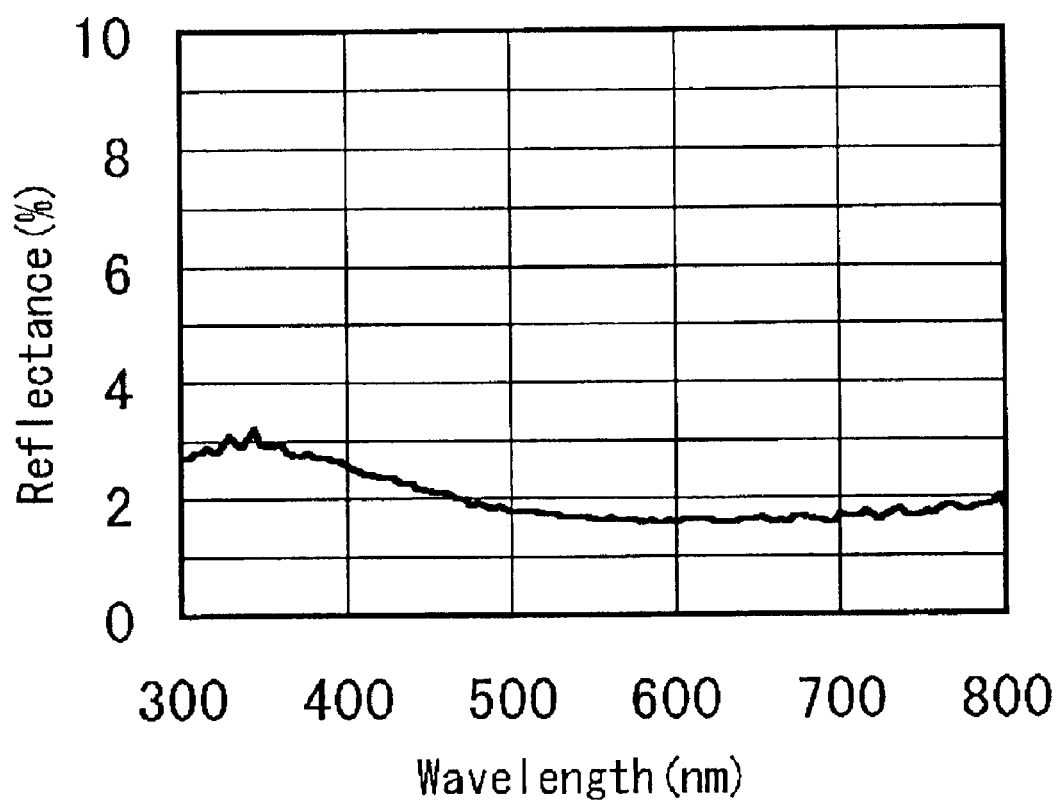
FIGS. 1 and 2 represent reflection spectra of laminated plates (specifically, laminated plates obtained in Examples 1 and 2) in the present invention.

A composition in the present invention comprises a hydrolyzable organosilicon compound and porous fine particles. The composition may comprise a hydrolyzable organosilicon compound in an amount of from about 20% by weight to about 90% by weight of and porous fine particles in an amount of from about 10% by weight to about 80% by weight based on the total amount of the hydrolyzable organosilicon compound and the porous fine particles.

A hydrolyzable organosilicon compound used in the preset invention may or may not have a fluorine atom in its molecule. Preferably, a composition in the preset invention contains a hydrolyzable organosilicon compound having no fluorine atoms in its molecule and optionally contains a hydrolyzable organosilicon compound having a fluorine atom in its molecule. (Hereinafter, the hydrolyzable organosilicon compound having a fluorine atom may be referred to as "a fluorine-containing hydrolyzable organosilicon compound").

A coating obtained by curing a composition in the present invention is a layer serving as a surface function layer. When the coating has a suitable thickness and a suitable refractive index, the coating becomes a layer serving as an anti-reflection layer. In such a coating, porous fine particles are present in a cured product of hydrolyzable organosilicon compound while being dispersed.

Due to the presence of porous fine particles and a hydrolyzable organosilicon compound in a composition, the resulting coating obtained by curing the composition in the present invention has improved adhering properties to a substrate. In particular, a significant effect is obtained when a methyl methacrylate-styrene copolymer is used as the substrate. A coating comprising a hydrolyzable organosilicon compound with no porous fine particle has an unsatisfactory adhesion to a substrate. Moreover, when a coating is formed as an anti-reflection coating, porous fine particles with a low refractive index are preferably utilized.

As described above, a composition in the present invention contains a hydrolyzable organosilicon compound. The hydrolyzable organosilicon compound include a hydrolyzable organosilicon compound containing no fluorine atoms in its molecule and a fluorine-containing hydrolyzable organosilicon compound. The hydrolyzable organosilicon compound with no fluorine atoms is a compound which has at least one hydrolyzable group in its molecule and which has an organic group bonded with a silicon atom. Examples of the hydrolyzable organosilicon compound with no fluorine atoms include a compound which is shown by formula (I) below:

$$Si(R^1)_p(R^2)_{4-p} \qquad (I)$$

wherein $R^1$ represents a hydrogen atom or an inert monovalent organic group, $R^2$ represents a hydrolyzable functional group, and p represents an integer of from 0 to 3.

Examples of the inert monovalent organic group represented by $R^1$ in formula (I) include alkyl groups having 1 to 4 carbon atoms, alkenyl groups having 2 to 4 carbon atoms and aryl groups including a phenyl group. Examples of the hydrolyzable functional group represented by $R^2$ include alkoxy groups having 1 to 5 carbon atoms such as methoxy and ethoxy, acyloxy groups such as acetoxy and propionyloxy, halogen atoms such as a chlorine atom and a bromine atom, and substituted silylamino groups such as trimethylsilylamino. Examples of well-known hydrolyzable organosilicon compounds include alkoxysilane compounds, halogenated silane compounds, acyloxysilane compounds, silazane compounds, etc. These organosilicon compounds may have substituents such as an aryl group, a vinyl group, an allyl group, a (meth)acryloyloxy group, an epoxy group, an amino group and a mercapto group as a part of $R^1$ or $R^2$ in the above-mentioned formula (I). Here, the term "(meth) acryloyloxy" represents both acryloyloxy and (meth)

acryloyloxy, and hereinafter, the term "(meth)" (as in (meth) acrylic acid, a (meth)acrylate and the like) has an analogous meaning indicating the optional presence of a methyl substituent.

Specific examples of the hydrolyzable organosilicon compound containing no fluorine atoms in its molecule include halogenated silane compounds such as methyltrichlorosilane; alkoxysilane compounds such as tetramethoxysilane, tetraethoxysilane, methyltrimethoxysilane, phenyltrimethoxysilane, phenyltriethoxysilane, dimethyldimethoxysilane, dimethyldiethoxysilane, vinyltrimethoxysilane, vinyltriethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane, γ-mercaptopropylmethyldimethoxysilane, γ-methacryloyloxypropyltrimethoxysilane, γ-methacryloyloxypropylmethyldimethoxysilane, γ-glycidoxypropyltrimethoxysilane and γ-glycidoxypropylmethyldimethoxysilane; silazane compounds such as hexamethyldisilazane; and the like. These may be used singly or in combination of two or more of them.

The hydrolyzable organosilicon compound containing no fluorine atoms in its molecule may be a monomer as described above or may be a multimer such as oligomers as large as approximately from dimer to decamer or may be a polymer having polymerization degrees greater than 10. Furthermore, the organosilicon compound may be a hydrolysate resulting from hydrolysis of the above-mentioned organosilicon compound. The hydrolysate can be generated by addition of an acid such as a hydrochloric acid, a phosphoric acid and an acetic acid or a base such as a sodium hydroxide and a sodium acetate into the above-mentioned hydrolyzable organosilicon compound.

A fluorine-containing hydrolyzable organosilicon compound is a compound which has at least one hydrolyzable group in its molecule and which has a fluorine-containing organic group bonded with a silicon atom. Examples of the fluorine-containing hydrolyzable organosilicon compound include a compound which is shown by following formula (II) below:

$$Rf\text{—}R^3\text{—}Si(R^4)_q(R^5)_{3-q} \quad (II)$$

wherein Rf represents a straight-chain or branched perfluoroalkyl group having 1 to 16 carbon atoms, $R^3$ represents a divalent organic group, $R^4$ represents a hydrogen atom or an inert monovalent organic group, $R^5$ represents a hydrolyzable functional group, and q represents an integer of from 0 to 2.

In formula (II), $R^3$ is a divalent organic group and specific examples thereof include the following groups:
—$CH_2CH_2$—,
—$CH_2OCH_2CH_2CH_2$—,
—$CONHCH_2CH_2CH_2$—,
—$CONHCH_2CH_2NHCH_2CH_2CH_2$—,
—$SO_2NHCH_2CH_2CH_2$—,
—$CH_2CH_2OCONHCH_2CH_2CH_2$—, etc.

$R^4$ is a hydrogen atom or an inert monovalent organic group, and specific examples thereof are the same as those of $R^1$ in formula(I). $R^5$ is a hydrolyzable functional group and specific examples thereof are the same as those of $R^2$ in formula (I).

Specific examples of the fluorine-containing hydrolyzable organosilicon compound as shown by formula (II) mentioned above are as follows:

$CF_3CH_2CH_2Si(OCH_3)_3$,
$C_4F_9CH_2CH_2Si(OCH_3)_3$,
$C_4F_9CH_2CH_2Si(CH_3)(OCH_3)_2$,
$C_8F_{17}CH_2CH_2Si(OCH_3)_3$,
$C_8F_{17}CH_2CH_2Si(OC_2H_5)_3$,
$C_8F_{17}CH_2CH_2SiCl_3$,
$(CF_3)_2CF(CF_2)_8CH_2CH_2Si(OCH_3)_3$,
$C_{10}F_{21}CH_2CH_2Si(OCH_3)_3$,
$C_{10}F_{21}CH_2CH_2SiCl_3$, etc.

Porous fine particles in the present invention are not specifically limited, and may be porous fine particles having an average diameter in a range of from about 5 nm to about 10 μm. In particular, fine particles having an average diameter in a range of from about 5 nm to about 100 nm is more preferably used when the resulting coating made from the composition comprising the fine particles is used as an anti-reflection film. Since particles having a too small particle diameter are difficult to be industrially produced, such particles are not suitable. On the other hand, particles having a too large diameter are not preferred because the resulting coating tends to have insufficient optical performances such as lowered transparency.

Examples of the porous fine particles in the present invention include silica fine particles and silica-containing complex oxide fine particles. These porous fine particles are preferably utilized since the particles have a low refractive index and strength in themselves. Porous silica fine particles usually have a refractive index of from about 1.2 to about 1.45, which is lower than a refractive index of from 1.46 of the usual silica fine particles, and is therefore preferably used for providing an anti-reflection material. The porous silica fine particles in the present invention may have a refractive index of from 1.2 to 1.45, preferably of from 1.2 to 1.44, more preferably of from 1.2 to 1.42 and most preferably of from 1.25 to 1.40.

Examples of the porous silica fine particles include a silica having a highly entangled and branched structure like a polymer. Such a structure may be prepared in a method in which an alkoxysilane is hydrolyzed in the presence of an alkali, as shown in Japanese Laid-Open Patent Publication No. (JP-A-) 7-48527.

The above-described silica fine particles and silica-containing complex oxide fine particles both may have a core-shell (double) structure in which a core particle is coated with a shell layer. The core particle and coating layer may be mainly made from silica ($SiO_2$). The core particle may have a porous structure, while the shell layer may have a less porous structure than the core particle. Such silica fine particles and silica-containing complex oxide fine particles, both having the core-shell structure, can be obtained, for example, by the method described in JP-A-7-133105. Specifically, the particles with the core-shell structure may be manufactured in which an alkoxysilane such as tetraethoxysilane (i.e., ethyl silicate) and tetramethoxysilane (i.e., methyl silicate) is added together with water, an alcohol and a catalyst such as an alkali or an acid in to a sol in which a porous silica fine particle is dispersed, to hydrolyze the alkoxysilane so that the surface of the porous silica fine particles are coated with the resulting hydrolyzed condensate.

The porous silica fine particles of which surface is coated to have a core-shell structure are preferably used since inlets of fine pores in the particles are blockaded and the porosity of the inside of the particles is maintained, and such particles may have an affinity with a hydrolyzable organosilicon compound and a hydrolysate.

A resin composition in the present invention comprises about 20% by weight to about 90% by weight of a hydrolyzable organosilicon compound and about 10% by weight to about 80% by weight of porous fine particles based on the total amount of the hydrolyzable organosilicon compound and the porous fine particles. When the amount of the porous fine particles is less than about 10% by weight, adhesion of the resulting cured coating to a substrate may be lowered, and a refractive index of the cured coating may not be lowered sufficiently, and therefore, it may be difficult to obtain a film with an adequate anti-reflection function. On the other hand, when the amount of the porous fine particles is larger than about 80% by weight, hardness of the resulting cured coating may be lowered, undesirably.

When a hydrolyzable organosilicon compound containing no fluorine atoms, a fluorine-containing hydrolyzable organosilicon compound and porous fine particles are contained in a composition of the present invention, each of them may be incorporated in the composition so that the amounts of the individual components become proper percentages falling within the range of from about 5% by weight to about 90% by weight based on the total amount of these components. When either one of or both of the amounts of the fluorine-containing hydrolyzable organosilicon compound and the porous fine particles are too small, the refractive index of the resulting coating may not be lowered sufficiently, and therefore, no sufficient anti-reflection performance may be obtained. On the other hand, when either one of or both of the amounts of them are too large, strength of the film may be lowered. Preferably, the total amount of the fluorine-containing hydrolyzable organosilicon compound and the porous fine particles is controlled to be in the range of from about 15% by weight to about 90% by weight based on the total amount of the hydrolyzable organosilicon compound containing no fluorine atoms, the fluorine-containing hydrolyzable organosilicon compound and porous fine particles.

When a coating is formed as an anti-reflection film using a composition in the present invention, the kind and the addition amount of the porous fine particle are appropriately selected so that the resulting formed (cured) coating may has a refractive index of from 1.2 to 1.45, preferably of from 1.25 to 1.41, and more preferably of from 1.30 to 1.40. In this case, the amount of porous fine particles to be added may vary depending on the refractive index of the porous fine particles to be used, and may be within the range of from 10% by weight to about 80% by weight, and preferably within the range of about 15% by weight to about 70% by weight based on the total amount of the hydrolyzable organosilicon compound and the porous fine particles.

A substrate which may be used in the present invention is not specifically limited as long as the substrate is transparent. Examples of the substrate include a resin substrate such as a poly(methyl methacrylate) resin, a polycarbonate resin, a polystyrene, a methyl methacrylate-styrene copolymer resin, an acrylonitrile-styrene copolymer resin and a triacetylcellulose resin; a inorganic substrate such as an inorganic glass; and the like. In particular, a methyl methacrylate-styrene copolymer resin is suitable for the substrate of an anti-reflection film since the resin has little expansion and shrinkage by absorbing moisture.

The substrate may have flat surface and shape such as those of a plate, a sheet, a film and the like. Alternatively, the substrate may a shape of which surface has a curvature such as a convex lens and a concave lens. Onto the surface, fine unevenness may be provided. When the substrate is a resin substrate, a coating (such as a hard coat layer) other than the film in the present invention may be formed on the surface.

Before placing a composition in the present invention on a substrate, the composition may be adjusted to be a so-called paint (or coating) which contains the above-described respective components. In addition to the above-mentioned components, such a paint may contain a catalyst for promoting the curing of compositions, such as an acid, a base, an organo-metallic compound and a metal ion; a solvent; various additives such as a stabilizer, an antioxidant, a colorant, a leveling agent and a surfactant; an ultraviolet absorption agent; and the like, if necessary.

As described above, a composition in the present invention may be used together with a solvent and may be used as a paint (or a coating), which is also within the scope of the present invention.

The solvent is preferably used for adjusting a concentration and viscosity of the paint, a thickness of the resulting cured coating, and the like. The solvent may be suitably selected. Examples of the solvent include alcohols such as methanol, ethanol, propanol, isopropanol, n-butanol, 2-butanol, isobutanol and tert-butanol; alkoxyalcohols such as 2-ethoxyethanol, 2-butoxyethanol, 3-methoxypropanol, 1-methoxy-2-propanol and 1-ethoxy-2-propanol; ketols such as diacetone alcohol; ketones such as acetone, methyl ethyl ketone and methyl isobutyl ketone; aromatic hydrocarbons such as toluene and xylene; esters such as ethyl acetate and butyl acetate; and the like. The amount of the solvent to be used is appropriately selected depending on the kind and shape of a substrate onto which the paint is applied, a method for coating the paint, a thickness of the objective coating and the like, and may be about 20 parts by weight to about 10,000 parts by weight based on 100 parts by weight of the total amount of the hydrolyzable organosilicon compound and the porous fine particles.

A paint in the present invention may contain a levering agent such as a silicone oil. By adding a silicone oil, leveling properties of the resulting cured coating is improved, and also, lubricity of the coating is improved, which results in providing the coating with hardness higher than a film with no silicone oil. The silicone oil may be a commonly-used silicone oil. Examples of the silicone oil include a dimethylsilicone oil, a phenylmethylsilicone oil, an alkyl- or aralkyl-modified silicone oil, a fluorosilicone oil, a polyether modified silicone oil, a fatty acid ester modified silicone oil, a methylhydrogensilicone oil, a silanol-containing silicone oil, an alkoxy-containing silicone oil, a phenol-group-containing silicone oil, a methacryl modified silicone oil, an amino modified silicone oil, a carboxylic acid modified silicone oil, a carbinol modified silicone oil, an epoxy modified silicone oil, a mercapto modified silicone oil, a fluorosis modified silicone oil, a polyether modified silicone oil, and the like. These silicone oils may be used alone, or may be used as a mixture of 2 or more kinds of them.

The amount of silicone oil to be added may be 0 to about 20 parts by weight based on 100 parts by weight of the total amount of the hydrolyzable organosilicon compound and porous fine particles in the composition. When the amount of silicone oil is larger than 20 parts by weight, optical properties or strength of the resulting coating may be lowered.

As described above, a coating comprising a composition in the present invention may be formed, for example, by in a method in which a paint which is prepared using the composition is applied onto a surface of a substrate. The application of a paint onto a substrate may be conducted in a commonly used method, such as a micro gravure coating method, a roll coating method, a dipping coating method, a float coating method, a spin coating method, a die coating method, a cast coating method, and a spray coating method.

A composition or paint in the present invention, which is applied on a substrate, may be cured by heating or the like, to provide a coating in the present invention. When the composition or paint contains a solvent, the curing may be carried out as it is together with the solvent, or may be carried out after evaporating the solvent. When the solvent is evaporated, the evaporation may be conducted while the composition or paint may be maintained at room temperature, or may be dried by heating at a temperature of from about 30° C. to about 100° C. The period of time for drying is appropriately selected depending on the kind and shape of a substrate onto which the paint is applied, a method for coating the paint, a thickness of the objective coating and the like.

In the curing of a coating by heating, the period of time and temperature for the heating are not specifically limited, and may be in the period of time for about one minute to about five hours at a temperature of from about 50° C. to about 120° C. When the coating contains a solvent, the curing by heating may be carried out as it is together with the solvent, or may be carried out after evaporating the solvent.

Thus obtained cured coating may have a thickness of from about 0.01 μm to about 20 μm, and preferably have a thickness of from about 0.01 μm to about 10 μm. When the film thickness is less than about 0.01 μm, characteristic as a cured coating tends to be hardly revealed. On the other hand, when the film thickness is larger than about 20 μm, there is a possibility that adhering properties of the film may be lowered, or crack and the like may be generated on the film, undesirably. In particular, when a coating is formed as an anti-reflection film, it is preferred that the film thickness is in the range of from about 0.01 μm to about 1 μm. When the film thickness is less than about 0.01 μm, or is more than about 1 μm, the function of the film as an anti-reflection film tends to be lowered.

A coating obtained from a composition in the present invention is superior in adhering properties to a substrate and is equipped with an adequate hardness. The coating acts as a surface functional layer. When the coating has an appropriate thickness and a refractive index, the film also works as an anti-reflection layer and is useful for a protective plate for a display and the like.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Applications Nos. 2001-347085 (filed on Nov. 13, 2001) and 2002-066615 (filed on Mar. 12, 2002), all indicating specification, claims, drawings and summary, are incorporated herein by reference in their entirety.

EXAMPLES

The present invention is described in more detail by reference to the following Examples, which should not be construed as a limitation upon the scope of the present invention.

In Examples, % and parts, both of which represent the content and the amount, are based on by weight unless otherwise mentioned. Further, films and substrates obtained in Examples were evaluated by methods below.

(1) Reflection Spectrum and Reflection Ratio

A face which should be the counter side to the measurement area side of a substrate was roughed by a steel wool and was then coated with a black paint to be dried. An absolute mirror reflection spectrum at an incident degree of 5° to the substrate to be measured was obtained using an ultraviolet visible light spectrophotometer ("UV-3100" manufactured by Shimadzu Corporation). A wavelength at which a reflection ratio shows a minimum value and the minimum value of the reflection ratio were determined using the obtained reflection spectrum.

(2) Adhering Property

In accordance with the "checkers tape method" which is prescribed in JIS K5400, the number of peelings per 100 checkers which had been provided at the surface of a film to be measured was counted. The peeling number is utilized for evaluating an adhering property of the film. The small number of the peelings means a high adhering property of the film.

Example 1

A paint was obtained by mixing and dispersing 100 parts of a sol which had been obtained by dispersing porous silica fine particles having particle diameters of from 20 nm to 70 nm of which surface was covered with a hydrolyzed polycondensate of ethyl silicate, in isopropyl alcohol at a concentration of 20%, 80 parts of tetraethoxysilane, 4240 parts of isopropyl alcohol, 500 parts of 2-butoxyethanol and 80 parts of 0.1 N hydrochloric acid [an aqueous solution containing 0.1 mol of HCl per 1,000 cm$^3$].

A methyl methacrylate-styrene copolymer resin plate ["ACRYACE MS" manufactured by Japan Acryace Co.] containing a styrene unit of about 40% was immersed in the above-obtained paint, and a dipping coating method was carried out at a pulling-up speed of 36 cm/min. After drying at room temperature for 5 minutes or more, the plate was further dried at 80° C. for 20 minutes, to obtain a laminated plate having anti-reflection properties.

The evaluation results of the laminated plate were shown in Table 1. A reflection spectrum of the laminated plate was shown in FIG. 1. A refractive index and a thickness of the coating of the plate were calculated from the reflection spectrum. As a result, the refractive index was 1.405, and the film thickness was 107 nm.

Example 2

A laminated plate having anti-reflection properties was prepared in the same manner as in Example 1 except that the compounds in the paint and blending ratios thereof were changed as follows.

| | |
|---|---:|
| 20% Sol of the same porous silica fine particles as used in Example 1 | 150 parts |
| Tetraethoxysilane | 70 parts |
| Isopropyl alcohol | 4,210 parts |
| 2-Butoxyethanol | 500 parts |
| 0.1 N Hydrochloric acid | 70 parts |

Figure 2:
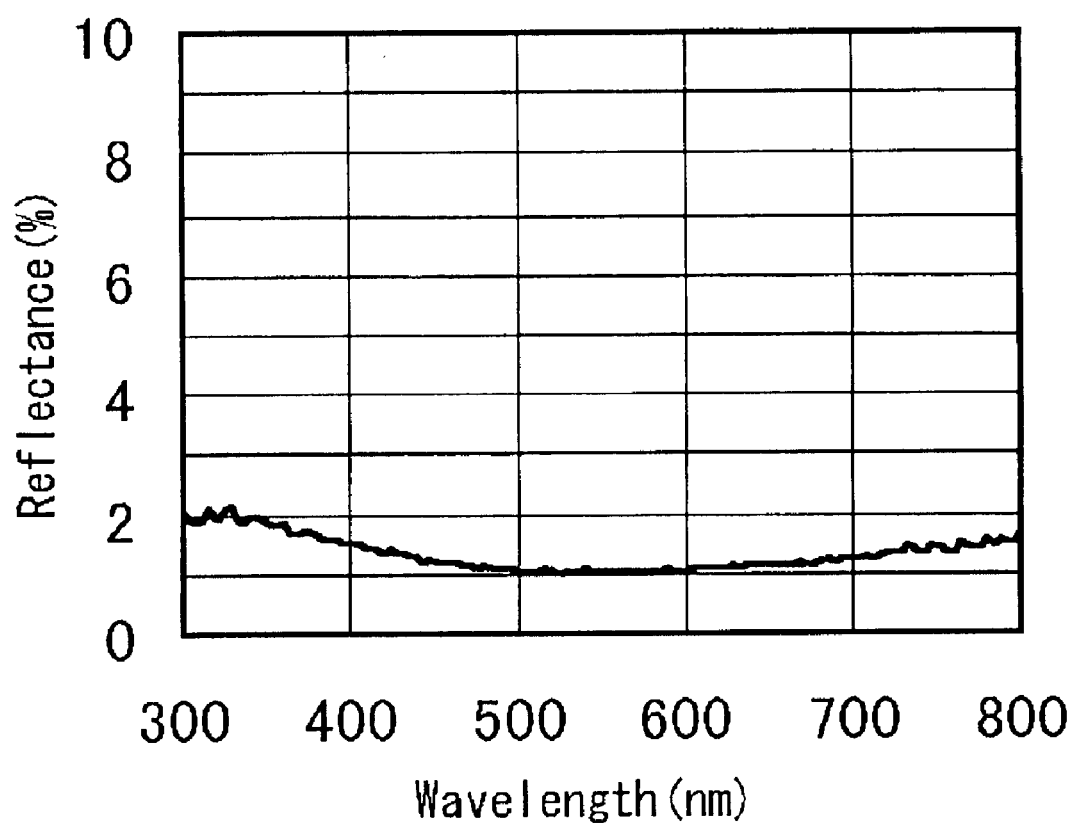

The evaluation results of the laminated plate were shown in Table 1. A reflection spectrum of the laminated plate was shown in FIG. 2. A refractive index and a thickness of the coating of the plate were calculated from the reflection spectrum. As a result, the refractive index was 1.368, and the film thickness was 101 nm.

Comparative Example 1

A laminated plate having anti-reflection properties was prepared in the same manner as in Example 1 except that the compounds in the paint and blending ratios thereof were changed as follows.

| | |
|---|---|
| 20% Sol of the same porous silica fine particles as used in Example 1 | 0 |
| Tetraethoxysilane | 100 parts |
| Isopropyl alcohol | 4,300 parts |
| 2-Butoxyethanol | 500 parts |
| 0.1 N Hydrochloric acid | 100 parts |

Figure 3:
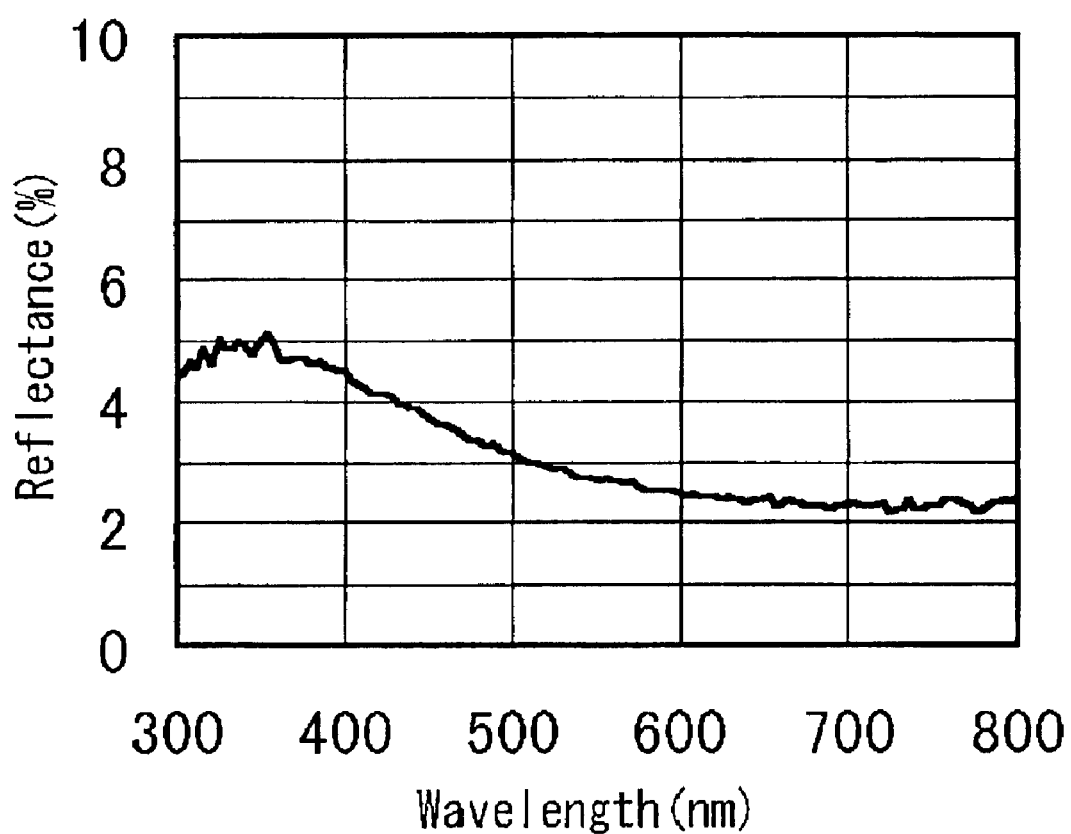
FIG. 3 represents a reflection spectrum of a laminated plate obtained in Comparative Example 1.

The evaluation results of the laminated plate were shown in Table 1. A reflection spectrum of the laminated plate was shown in FIG. 3. A refractive index and a thickness of the coating of the plate were calculated from the reflection spectrum. As a result, the refractive index was 1.441, and the film thickness was 125 nm.

TABLE 1

| | Minimum reflection ratio | Wavelength showing minimum reflection ratio | Adhering property |
|---|---|---|---|
| Example 1 | 1.6% | 600 nm | 0/100 (No peeling) |
| Example 2 | 1.0% | 550 nm | 0/100 (No peeling) |
| Comparative Example 1 | 2.3% | 720 nm | 52/100 (52% peeled) |

Example 3

A paint was obtained by mixing and dispersing 10 parts of a sol which had been obtained by dispersing porous silica fine particles having particle diameters of from 20 nm to 70 nm of which surface was covered with a hydrolyzed polycondensate of ethyl silicate, in isopropyl alcohol at a concentration of 20%, 5 parts of tetraethoxysilane, 3 parts of 2-(perfluorooctyl)ethyltrimethoxysilane [$CF_3(CF_2)_7CH_2CH_2Si(OCH_3)_3$], 424 parts of isopropyl alcohol, 50 parts of 2-butoxyethanol and 8 parts of 0.1 N hydrochloric acid.

A methyl methacrylate-styrene copolymer resin plate ["ACRYACE MS" manufactured by Japan Acryace Co.] containing a styrene unit of about 40% was immersed in the above-obtained paint, and a dipping coating method was carried out at a pulling-up speed of 24 cm/min. After drying at room temperature for one minute or more, the plate was further dried at 80° C. for 20 minutes, to obtain a laminated plate having anti-reflection properties.

The evaluation results of the laminated plate were shown in Table 2. A refractive index and a thickness of the coating of the plate were calculated from the reflection spectrum. As a result, the refractive index was 1.38, and the film thickness was 100 nm. The laminated plate had little coloring of reflected light caused by interference coloring.

Example 4

A laminated plate having anti-reflection properties was prepared in the same manner as in Example 3 except that the compounds in the paint and blending ratios thereof were changed as follows.

| | |
|---|---|
| 20% Sol of the same porous silica fine particles as used in Example 3 | 20 parts |
| Tetraethoxysilane | 4 parts |
| 2-(perfluorooctyl)ethyltrimethoxysilane | 2 parts |
| Isopropyl alcohol | 418 parts |
| 2-Butoxyethanol | 50 parts |
| 0.1 N Hydrochloric acid | 6 parts |

The evaluation results of the laminated plate were shown in Table 2. A refractive index and a thickness of the coating of the plate were calculated from the reflection spectrum. As a result, the refractive index was 1.35, and the film thickness was 98 nm. The laminated plate had little coloring of reflected light caused by interference coloring.

TABLE 2

| | Minimum reflection ratio | Wavelength showing minimum reflection ratio | Adhering property |
|---|---|---|---|
| Example 3 | 1.25% | 550 nm | 0/100 (No peeling) |
| Example 4 | 0.74% | 530 nm | 0/100 (No peeling) |

What is claimed is:

1. A composition comprising a hydrolyzable organosilicon compound in an amount of from about 20% by weight to about 90% by weight and porous fine particles in an amount of from about 10% by weight to about 80% by weight based on the total amount of the hydrolyzable organosilicon compound and the porous fine particles,
    wherein the porous fine particles are fine particles selected from a group of silica fine particles and silica-containing complex oxide fine particles, the fine particles having a core-shell structure in which a core particle is coated with a shell layer.

2. A composition comprising a hydrolyzable organosilicon compound in an amount of from about 20% by weight to about 90% by weight and porous fine particles in an amount of from about 10% by weight to about 80% by weight based on the total amount of the hydrolyzable organosilicon compound and the porous fine particles,
    wherein the hydrolyzable organosilicon compound comprises an organosilicon compound having no fluorine atoms in its molecule and an organosilicon compound having a fluorine atom in its molecule.

3. A composition according to claim 1 or 2, wherein the porous fine particles are fine particles which are selected from a group of silica fine particles and silica-containing complex oxide fine particles.

4. A composition according to claim 2, wherein the porous fine particles are fine particles selected from a group of silica fine particles and silica-containing complex oxide fine particles, the fine particles having a core-shell structure in which a core particle is coated with a shell layer.

5. A composition according to claim 1 or 2, wherein the porous fine particle has a refractive index of 1.2 to 1.45.

6. A composition according to claim 3, wherein the porous fine particle has a refractive index of 1.2 to 1.45.

* * * * *